United States Patent [19]

Kobayashi et al.

[11] 4,039,277

[45] Aug. 2, 1977

[54] APPARATUS FOR CALCINING POWDER MATERIALS

[75] Inventors: Toshihiro Kobayashi, Tokyo; Yoshifumi Nitta, Yokohama, both of Japan

[73] Assignee: Ishikawajima-Harima Jukogyo Kabushiki Kaisha, Ote, Japan

[21] Appl. No.: 627,289

[22] Filed: Oct. 30, 1975

[30] Foreign Application Priority Data

Nov. 7, 1974 Japan .................. 49-128406

[51] Int. Cl.² .................. F27B 7/02; F27B 15/00
[52] U.S. Cl. .................. 432/106; 432/58
[58] Field of Search .................. 432/14, 15, 16, 58, 432/106; 34/57 A, 57 R

[56] References Cited

U.S. PATENT DOCUMENTS

| 3,752,455 | 8/1973 | Zacpal et al. ............ 432/58 |
| 3,869,248 | 3/1975 | Hirai et al. ............ 432/106 |
| 3,904,353 | 9/1975 | Bosshard et al. ............ 432/106 |
| 3,914,098 | 10/1975 | Kano et al. ............ 432/58 |

FOREIGN PATENT DOCUMENTS 1,184,744  1/1965  Germany .................. 432/106

*Primary Examiner*—John J. Camby
*Assistant Examiner*—Henry C. Yuen
*Attorney, Agent, or Firm*—Scrivener, Parker, Scrivener and Clarke

[57] ABSTRACT

Almost all of the powder materials, after having been calcined in a calcining furnace, are treated by the high temperature kiln exhaust without being directly fed into a rotary kiln, so that the materials may pass through at least two calcining zones in series so that they are calcined perfectly and uniformly before they are fed into the kiln, thereby contributing to make compact a rotary kiln in size and to improve overall thermal efficiency of the calcining and burning (sintering) apparatus.

1 Claim, 4 Drawing Figures

APPARATUS FOR CALCINING POWDER MATERIALS

DETAILED DESCRIPTION OF THE INVENTION

Figure 1:
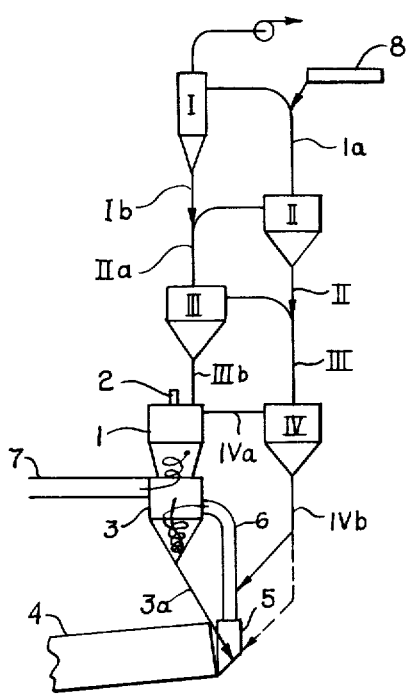

The present invention relates to an improvement of an apparatus for calcining finely ground raw materials in the turbulent gas flow.

The suspension preheater systems have been widely used for the production of cement clinker for a quarter century. A typical suspension preheater system comprises multiple stages of heat-exchanger units consisting of a single or plural cyclones arranged in such a way that gases exhausted from a rotary kiln or the like may flow through the heat exchanger stages sequentially, thereby preheating the powder materials to be fed into the kiln.

In this system, however, when the temperature of the kiln exhaust exceedes 1,200° C, remarkable coating adheres to the inner walls of the kiln end housing and ducts connecting the housing and cyclones and/or fluidity of the powder materials is reduced, thus adversely affecting the operation of the kiln. Because of such a temperature limitation of kiln exhaust, only 30 to 50% calcination of the powder materials can be accomplished in the conventional suspension preheater system and remaining calcining reaction must take place in the rotary kiln which is no longer a rational heat exchanger for the reaction.

To overcome the above problems, recently there has been devised and demonstrated a suspension preheater system with a calciner (a calcining furnace) for effecting the sufficient calcination of cement raw materials before they are fed into the kiln. For instance, in the conventional system shown in FIG. 3, the raw materials are preheated, as they flow down through three stages of preheating units I, II and III, by the heat of the gases leaving the calcining stage IV, and are thrown into the calciner A, together with the fuel, in which the turbulent flows are formed by the secondary air from the cooler C and the exhaust gases from the rotary kiln K induced tangentially. In another conventional system of the type shown in FIG. 4, the preheated raw materials and the fuel are thrown into the calciner A in which the turbulnt flows are formed only by the secondary air from the cooler C induced tangentially. In both systems, as the fuel supplied into the turbulent flows is burned, the developed heat is instantaneously transferred to the raw meal particles, thereby combutsion and calcination take place simultaneously. In the system shown in FIG. 4, the gases discharged from the calciner A carrying calcined materials are mixed further with the high-temperature exhaust from the kiln K at the joint $a$ and thus calcination of raw materials is improved before they are fed into the kiln K.

As approximately 90% calcination is accomplished in the conventional suspension preheater system with a calciner, the rotary kiln is almost relieved from unfavorable calcining reaction of raw materials. Therefore, the system could exhibit an advantage that the rotary kiln which suffers remarkable abrasion of refractory lining can be made compact in size as compared with the conventional suspension preheater systems without a calciner. However, the overall thermal efficiency of the cement clinker burning (sintering) apparatus has not been improved because the unfavourable reaction, combustion and heat-exchange conditions in the calcining stage IV and operational disturbances in the clinker burning apparatus as described below cause the increase in temperature as well as flow rate of the gases sent to the preheater stage III from the calcining stage IV.

1. As the calcination proceeds, the partial pressure of carbon dioxide ($CO_2$) increases, resulting in the retard of calcining reaction. As a a result, it is difficult to instantaneously calcine the raw materials unless they are heated to the temperature level of approximately 900° C.

2. In both the above conventional systems, the direct heat exchange between the raw materials and the high temperature exhaust from the rotary kiln is not effected. In other words, in the system shown in FIG. 3, the kiln exhaust of 1,100°-1,200° c, by which approximately 20% of the raw materials can be sufficiently calcined, is carelessly mixed with the secondary air of 650°-700° C from the cooler C, while in the system shown in FIG. 4, it is mixed with the gases of approximately 900° C discharged from the calciner A. As a result, a high potential heat of the kiln exhaust gases, which is higher than the temperature to complete calcination (approximately 900° C), is not effectively utilized.

3. Furthermore, coating grows rapidly to the inner walls of the duct of kiln exhaust and it must be often poked off through holes provided along the walls. This will bring an increase in leak air to the apparatus and the distrubances in operation.

4. The draft resistance in the secondary air duct D extending from the cooler C is higher than that in the rotary kiln K so that an orifice or the like O must be installed in the kiln exhaust duct in order to send the sufficient quantity of secondary air into the calciner A. Not only the orifice brings a useless power consumption to the apparatus but also it is installed at the high temperature zone where the growth of coating is very rapid, so that the accurate flow control becomes difficult and the operation of the apparatus may get fatal effect by the plugging of orifice.

One of the objects of the present invention is therefore to substantially eliminate these problems encounted in the conventional suspension preheater systems with a calciner.

Figure 3:
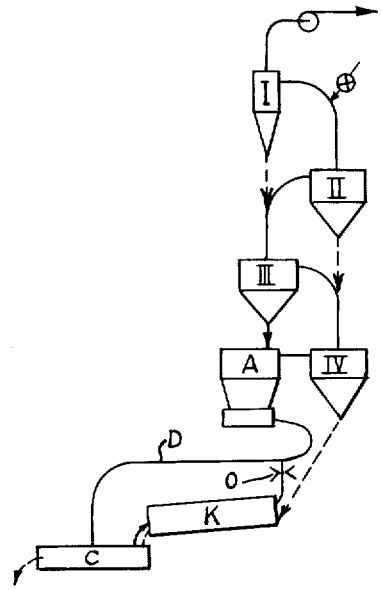
Figure 2:
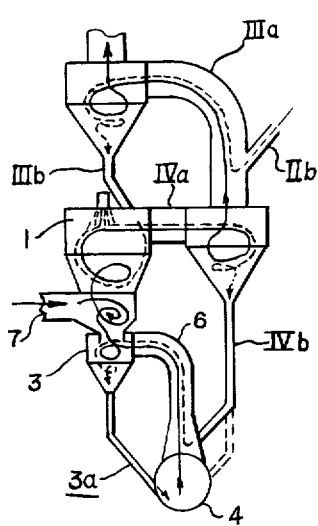
Figure 4:
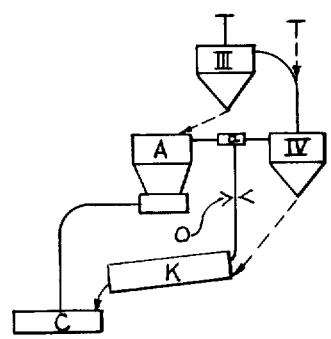

The present invention will become more apparent from the following description of the preferred embodiments thereof taken in conjunction with the accompanying drawings in drawing FIG. 1 is a schematic view of one preferred embodiment of the present invention;

FIG. 2 is a fragmentary view, on enlarged scale of the calcining stage of the other preferred embodiment thereof; and FIGS. 3 and 4 are schematic views of the conventional suspension heater systems with a calciner.

Referring to FIGS. 1 and 2, reference numerals I, II, III and IV denote cyclones interconnected through gas ducts I$a$, II$a$ and III$a$ and constituting the three stages of the preheater unit, the calciner 1 provided with a calcining burner and of which upper end is connected through a gas duct IV$a$ to a cyclone IV, whereby gases from the calciner 1 flow through the cyclone IV, the gas duct III$a$, the cyclone III, the gas duct II$a$, the cyclone II, the gas duct I$a$ and the cyclone I and is discharged out of the system. The above arrangement is substantially similar to that of the conventional suspension preheater systems.

According to the present invention, a separator 3, such as a cyclone or the like, is attached to the lower end of the calciner 1. A duct 7 is provided in order to send the secondary air from a clinker cooler (not shown) into the separator 3 and a gas duct 6 is provided to connect the separator 3 with a feed end housing 5 of a rotary kiln 4 in order to send the high temperature kiln exhaust into the separator 3. These ducts are connected to the calciner from tangential directions or by way of scrolls. A chute 3a is attached to the lower end of the separator 3 for feeding the collected calcined raw materials into the rotary kiln 4. In addition to the above units there are provided a raw material feeder 8, chutes Ib and IIb for feeding into the gas ducts IIa and IIIa the materials separated and collected in the cyclones I and II respectively: a chute IIIb for feeding into the calciner 1 the materials separated and collected in the cyclone III; and a chute IVb for feeding into the lower portion of the gas duct 6 the calcined materials separated and collected in the cyclone IV.

In FIGS. 1 and 2, to simplify the explanation a calcining burner 2 is installed on the ceiling of the calciner 1 as an example. However, it is preferable to provide multiple burners 2 at the conical part of the calciner 1 and/or at the secondary air access of the separator 3.

Next the mode of operation of the system with the above construction will be described. The cement raw materials of powder to be referred to as the "raw materials" hereinafter are thrown by way of the feeder 8 into the gas duct Ia downwardly so that they are suspended in the exhaust gas flow upwardly and carried into the cyclone 1. In the cyclone I, the raw materials are separated from the exhaust gas, and are fed into the gas duct IIa through the chute Ib. In the same manner, the raw materials flow through the cyclone II, the chute IIb, the gas duct IIIa, the cyclone III and the chute IIIb in the order named. Thus they are preheated stage by stage by the heat exchanger with gasses of a higher temperature before they are fed into the calciner 1.

In the calciner 1, the raw materials are thrown into the turbulent flows formed by the secondary air from the cooler through the secondary air duct 7 and the exhaust gases from the rotary kiln 4 through the exhaust gas duct 6, and are calcined by the combustion heat of the fuel supplied through the burner 2, to be "the primary calcined materials" containing some uncalcined portions. Then, the primary calcined materials are carried by the gases through the gas duct IVa into the cyclone IV, where they are separated from the combustion gases.

All or part of the primary calcined materials separated in the cyclone IV are fed into the gas duct 6 whiile the remaining materials are fed into the kiln feed end housing 5 as indicated by the broken lines in FIGS. 1 and 2. The primary calcined materials fed into the gas duct 6 are suspended in the kiln exhaust and are further heated so that uncalcined portion contained in the primary calcined materials may be almost completely calcined. The materials to be referred to as the "secondary calcined materials" are carried into the separator 3, where they are separated from the exhaust gases and fed through the chute 3a into the rotary kiln 4. The swirling exhaust gases free from the materials together with the secondary air tangentially induced through the air duct 7 to produce the turbulent flows in the calciner 1.

The raw materials preheated up to approximately 700° C in the three stages of heat exchange unit are further heated to 830°-840° C and accomplish their calcination by 70-80% by the combustion heat in the calciner 1. The primary calcined materials thus obtained are further heated in the gas duct 6, by the heat of the kiln exhaust of 1,000-1,200° C, to 860°-880° C and uncalcined portions of the materials are treated. Thus the secondary calcined materials, almost all of which have been calcined, are fed into the rotary kiln 4.

The apparatus of the invention to be operated in such a manner as described above will exhibit the following advantages as compared with the conventional apparatus as per FIGS. 3 and 4.

1. The calcination percentage of the primary calcined materials carried by the combustion gases, of which the partial pressure of carbon oxide ($CO_2$) is approximately 30%, from the calciner 1 to the cyclone IV is 10-20% lower than that of calcined materials in the conventional system (approximately 90%) so that the appointed calcination can be completed by gases leaving the cyclone IV with the temperature 30°-50° C lower than that of the conventional system.

2. The kiln exhaust gases with a high heat potential, without deteriorated by the lower temperature gases such as the secondary air from the cooler C (in case of FIG. 3) or the calciner exhaust (in case of FIG. 4), heat up and calcine the uncalcined portion (20-30%) of the primary calcined materials thrown into the gases at once under the very favourable conditions for heat transfer. Therefore calcination percentage of the secondary calcined materials, separated from the kiln exhaust in the separator 3 and fed into the rotary kiln 4, will be even higher and more uniform than the conventional system owing to the treatment in two calcining zones.

3. Due to this heat exchange, the temperature of the kiln exhaust drops rapidly so that instead of being condensed and deposited on the inner wall surfaces of the exhaust gas duct 6, alkali vapor in the kiln exhaust is condensed on the surfaces of the secondary calcined materials, whereby the coating problem may be substantially eliminated.

4. In the conventional system, a certain means for draft resitstnce, such as an orifice or the like O must be provided on the kiln exhaust duct in order to balance the draft of the kiln exhaust with that of the secondary air from the cooler to be induced into the calciner, but according to the present invention, the primary calcined materials fed and suspended in the kiln exhaust flowing through the duct 6 brings an increase in draft resistance of kiln gases. This means that a proper balance between the combustion air flowing through the secondary-air-duct 6 and the gas flowing through the rotary kiln 4 can be adjusted and maintained by the amount of the primary calcined materials to be suspended in the kiln exhaust. Therefore, the orifice may be completely eliminated, and no additional energy or power for suspending the materials in the kiln exhaust is requried. Thus, the adverse effect on the operation of the clinker burning apparatus due to the formation of coating on the orifice may be completely eliminated.

Because of the reasons described above, according to the present invention, the quantity of exhaust heat of the gases directed from calcining stage (cyclone IV) to preheating stages (cyclones I, II and III) may be considerably reduced as compared with the conventional system and yet the operation is stabilized so that the overall thermal efficiency of the cement clinker burning apparatus may be remarkably improved. Furthermore, the secondary calcined materials which have been more completely and uniformly calcined in the manner described above are fed into the rotary kiln 4 so that the kiln can be made further compact in size. So far only two representative embodiments of the present invention have been described, but it is to be understood that the present invention is not limited thereto and that various modifications may be effected within the true spirit of the present invention. For instance, instead of feeding the primary calcined materials into the kiln exhaut gas duct 6, they may be directly fed into the kiln back end housing 5. In this case, it is preferable to provide suitable means for positively dispersing all of the primary calcined materials charged in the kiln exhaust.

What is claimed is:

1. An apparatus for calcining powder materials comprising a calcining furnace provided with inlet means for supplying the furnace with raw materials to be calcined, a plurality of preheater cyclones for feeding preheated raw materials to said inlet means, said furnace having a burner, a rotary kiln having an inlet for raw materials, said furnace having a connection for conducting combustion air to the furnace, a separator in said connection and positioned at the bottom of the furnace, conduit means for conducting high temperature exhaust gas from the kiln to the furnace through the separator, a conduit connecting the separator and the inlet of the kiln, a cyclone connected with the furnace for separating calcined materials from combustion gases and conducting the last named materials to said conduit means, said materials being suspended in the exhaust gases in the conduit means and being further heated and calcined and conducted to said separator where they are separated from said exhaust gases and conducted through said conduit to said kiln whereby the preheated materials are fed into the furnace and partly calcined therein, the partially calcined materials are conducted to the last named cyclone wherein the materials are separated from gases, the separated calcined materials are suspended in the kiln exhaust gases in said conduit means so that uncalcined portions are calcined, the completely calcined materials being separated from the kiln exhaust gases in said separator and fed into said kiln through said conduit, and a raw material conduit for directly supplying the kiln inlet with at least a portion of the materials separated in said last named cyclone.

* * * * *